United States Patent
Utsunomiya

(10) Patent No.: US 9,998,813 B2
(45) Date of Patent: Jun. 12, 2018

(54) MICROPHONE

(71) Applicant: SII Semiconductor Corporation, Chiba-shi, Chiba (JP)

(72) Inventor: Fumiyasu Utsunomiya, Chiba (JP)

(73) Assignee: ABLIC INC., Chiba (JP)

( * ) Notice: Subject to any disclaimer, the term of this patent is extended or adjusted under 35 U.S.C. 154(b) by 0 days. days.

(21) Appl. No.: 15/679,652

(22) Filed: Aug. 17, 2017

(65) Prior Publication Data
US 2018/0054666 A1 Feb. 22, 2018

(30) Foreign Application Priority Data
Aug. 19, 2016 (JP) .................. 2016-161334

(51) Int. Cl.
*H04R 1/08* (2006.01)
*G06K 9/00* (2006.01)
*G06F 1/32* (2006.01)

(52) U.S. Cl.
CPC ............... *H04R 1/083* (2013.01); *G06F 1/32* (2013.01); *G06K 9/00221* (2013.01)

(58) Field of Classification Search
CPC ........ H04R 1/083; G06F 1/32; G06K 9/00221
USPC ........ 381/112, 113, 114, 115, 175, 355, 375, 381/385
See application file for complete search history.

(56) References Cited

U.S. PATENT DOCUMENTS

| | | | |
|---|---|---|---|
| 2006/0126880 A1* | 6/2006 | Chang | H04R 1/083 381/361 |
| 2014/0139466 A1* | 5/2014 | Sakaguchi | G06F 3/011 345/173 |
| 2016/0144817 A1* | 5/2016 | Chambers | B60R 21/0136 340/436 |

FOREIGN PATENT DOCUMENTS

JP  2004-072559 A  3/2004

* cited by examiner

*Primary Examiner* — William A Jerez Lora
(74) *Attorney, Agent, or Firm* — Brinks Gilson & Lione

(57) ABSTRACT

Provided is a microphone which is capable of detecting a face or the like of the person and maintaining an on-state even when the face or the like of the person which has approached the microphone does not move. A power supply of the microphone turns on according to a reception of a reflected light of an emission from the first and/or second light-emitting element, which is arranged at a position around an outer periphery of the sound pickup portion of the microphone by the first and/or second light-receiving element, which is arranged at an another position around the outer periphery of the sound pickup portion of the microphone.

3 Claims, 4 Drawing Sheets

MICROPHONE

RELATED APPLICATIONS

This application claims priority under 35 U.S.C. § 119 to Japanese Patent Application No. 2016-161334 filed on Aug. 19, 2016, the entire content of which is hereby incorporated by reference.

BACKGROUND OF THE INVENTION

1. Field of the Invention

The present invention relates to a microphone which is configured to pick up a sound such as a voice of a person.

2. Description of the Related Art

FIG. 4 is a schematic view of a related-art microphone 300.

As illustrated in FIG. 4, the related-art microphone 300 includes a sound pickup portion 301 having a spherical shape which is connected to one end of a grip portion 305 having a rod-like shape, and a pyroelectric sensor 310 which is provided at the top of the microphone 300. With the above-mentioned configuration, a power supply of the microphone 300 can be turned on when the pyroelectric sensor 310 detects an approach of a sound source such as a face or the like of a person (see FIG. 2 of Japanese Patent Application Laid-open No. 2004-72559).

In the related-art microphone 300, the pyroelectric sensor 310 outputs a change in amount of infrared ray, which is generated from a face or the like of a person, as a change in voltage, and the proximity of the face or the like of the person is detected based on the output voltage change. Accordingly even a person is present near the pyroelectric sensor 310, the person cannot be detected as long as the person does not move since the amount of the incoming infrared ray to the pyroelectric sensor 310 does not change, resulting in no change in the output voltage.

According to the related-art microphone 300 configured as described above, the power supply is turned on when an approaching movement of a person is detected, whereas the power supply is turned off when the person who has approached the microphone 300 does not move.

SUMMARY OF THE INVENTION

The present invention has an object to provide a microphone which is capable of turning on its power supply when an approach of a face or the like of a person is detected and maintaining an on-state of the power supply even when the face or the like of the person does not move at the approached position, without degradation of a sound pickup performance.

According to one embodiment of the present invention, there is provided a microphone including: a grip portion, which has a rod-like shape; a sound pickup portion, which has one of a substantially spherical shape and a substantially columnar shape having an axis matching with a longitudinal direction of the grip portion, and is connected to one end of the grip portion; a first light-emitting element, which is arranged at a first position around an outer periphery of the sound pickup portion; a second light-emitting element, which is arranged at a second position opposed to the first position around the outer periphery of the sound pickup portion; a first light-receiving element, which is arranged at a third position being one of two intermediate points between the first position and the second position around the outer periphery of the sound pickup portion; and a second light-receiving element, which is arranged at a fourth position being another of the two intermediate positions, in which: a light-emitting surface of each of the first light-emitting element and the second light-emitting element and a light-receiving surface of each of the first light-receiving element and the second light-receiving element are oriented in a direction opposite to an extending direction of the grip portion from the sound pickup portion; and a power supply of the microphone turns on according to a reception of a reflected light of an emission from the first light-emitting element and/or the second light-emitting element by the first light-receiving element and/or the second light-receiving element.

As described above, Light emitted from the first and/or second light-emitting element strikes on a nearby object, and the first and/or second light-receiving element receives reflected light being light reflected from the object. Then, the power supply is turned on when the reflected light is received. With this configuration, the power supply is turned on when a face or the like of a person approaches the microphone. Further, a state continues, in which the light-receiving element receives the reflected light of light emitted from the light-emitting element, even when the face or the like of the person having approached the microphone does not move. Thus, the on-state of the power supply can be maintained.

Further, the first and second light-emitting elements and the first and second light-receiving elements are arranged around the outer periphery of the sound pickup portion. The above-mentioned effect can therefore be achieved without degradation of the sound pickup performance.

DETAILED DESCRIPTION OF THE PREFERRED EMBODIMENTS

Now, an embodiment of the present invention is described with reference to the drawings.

Figure 1:
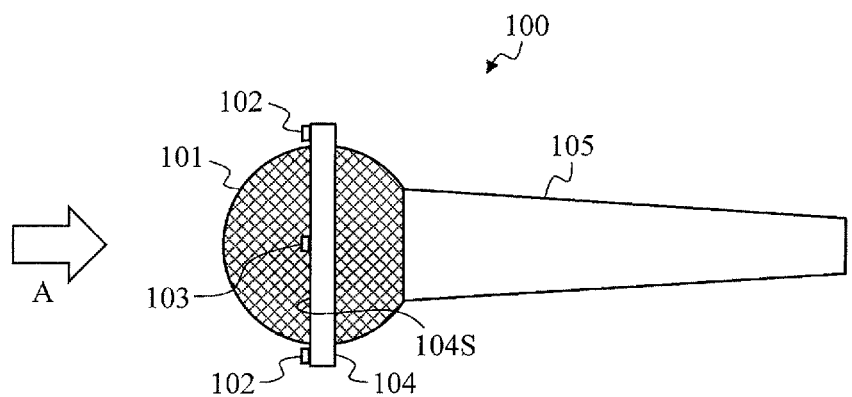
FIG. 1 is a view for illustrating a schematic structure of a microphone according to an embodiment of the present invention.

FIG. 1 is a view for illustrating a schematic structure of a microphone 100 according to this embodiment.

The microphone 100 includes a grip portion 105, a sound pickup portion 101, light-emitting elements 102, and light-receiving elements 103. The grip portion 105 has a rod-like shape. The sound pickup portion 101 has a substantially spherical shape and is connected to one end of the grip portion 105. The light-emitting elements 102 and the light-receiving elements 103 are provided around an outer periphery of the sound pickup portion 101 as viewed from a distal end of the microphone 100 and serve as proximity sensors.

The microphone 100 further includes a protection ring 104. The protection ring 104 is provided around the outer periphery of the sound pickup portion 101 and is configured to protect the sound pickup portion 101 when the microphone 100 is laid down. The light-emitting elements 102 and the light-receiving elements 103 are arranged on an upper surface 104S of the protection ring 104 which is oriented in a direction toward the distal end of the microphone 100.

In the following, with reference to FIG. 2, description is made of arrangement and the like of the light-emitting elements 102 and the light-receiving elements 103.

Figure 2:
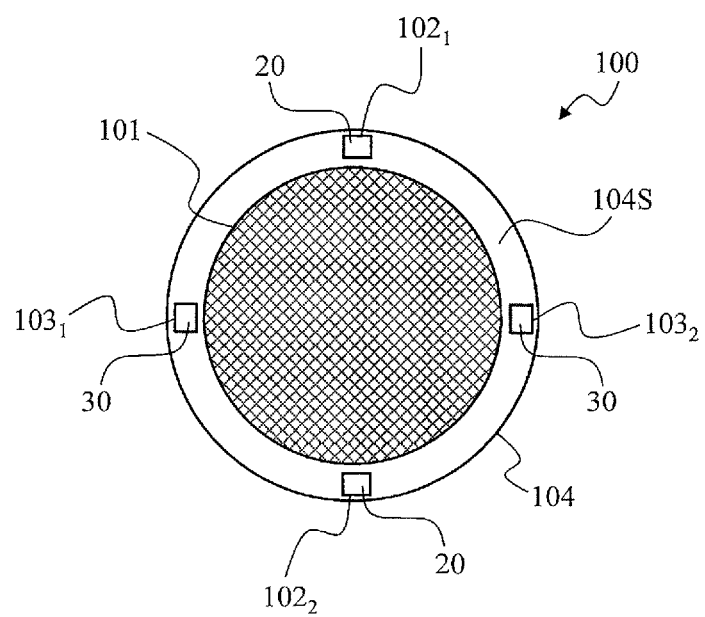
FIG. 2 is a schematic front view of the microphone of FIG. 1 as viewed from the direction of an arrow A.

FIG. 2 is a schematic front view of the microphone of FIG. 1 as viewed from the direction of an arrow A.

Two light-emitting elements 102 and two light-receiving elements 103 are provided on the upper surface 104S of the protection ring 104. On the sheet of FIG. 2, the light-emitting elements 102 ($102_1$ and $102_2$) are arranged at an upper portion and a lower portion, respectively, and the light-receiving elements 103 ($103_1$ and $103_2$) are arranged at a left portion and a right portion, respectively.

Specifically, a first light-emitting element $102_1$ is arranged at a first position around the outer periphery of the sound pickup portion 101. A second light-emitting element $102_2$ is arranged at a second position opposed to the first position around the outer periphery of the sound pickup portion 101. A first light-receiving element $103_1$ is arranged at a third position being one of two intermediate points between the first position and the second position around the outer periphery of the sound pickup portion 101. A second light-receiving element $103_2$ is arranged at a fourth position being another of the two intermediate points.

Further, light-emitting surfaces 20 of the light-emitting elements 102 ($102_1$ and $102_2$) and light-receiving surfaces 30 of the light-receiving elements 103 ($103_1$ and $103_2$) are oriented in a direction toward the distal end of the microphone 100, that is, in a direction opposite to a direction in which the grip portion 105 illustrated in FIG. 1 extends from the sound pickup portion 101.

The microphone 100 including the above-mentioned light-emitting elements 102 and light-receiving elements 103 has the following configuration. When a face or the like of a person approaches the microphone 100, light emitted from the light-emitting elements 102 reflects from the face or the like of the person. When the reflected light enters the light-receiving elements 103, a power supply of the microphone 100 is turned on.

With the microphone 100 according to this embodiment having the above-mentioned configuration, the approach of a face or the like of the person and the proximity of a face or the like of the person are detected when the reflected light being light emitted from the light-emitting elements 102 ($102_1$ and $102_2$) and reflected from the face or the like of the person is received at the light-receiving elements 103($103_1$ and $103_2$), and the power supply can be turned on based on the detection.

With this configuration, the power supply is turned on when a face or the like of the person approaches the microphone 100. Further, the on-state of the power supply can be maintained even when the face or the like of the person is present nearby but does not move.

Further, the light-emitting elements 102 and the light-receiving elements 103 being the proximity sensors are arranged on the protection ring 104 provided around the outer periphery of the sound pickup portion 105. The sound to be picked up is thus not blocked by the proximity sensors. Degradation of the sound pickup performance due to the presence of the proximity sensors can therefore be prevented.

Further, in the microphone 100 according to this embodiment, all of the light-emitting surfaces 20 of the light-emitting elements 102 and the light-receiving surfaces 30 of the light-receiving elements 103 are oriented in the direction toward the distal end of the microphone 100, thereby being capable of preventing entry of the reflected light, which is emitted from the light-emitting elements 102 and strikes on a structure of the microphone, into the light-receiving elements 103. Further, in addition to the configuration described above, the light-emitting elements 102 and the light-receiving elements 103 are arranged in the positional relationship illustrated in FIG. 2, thereby being capable of preventing entry of the reflected light, which is emitted from the light-emitting elements 102 and strikes on the sound pickup portion 101, into the light-receiving elements 103.

Accordingly, correct turning on of the power supply can take place only when a face or the like of the person approaches the microphone 100 since erroneous turning on of the power supply due to the reflected light by the microphone 100 itself can be prevented.

In this embodiment, for example, the proximity sensors may include elements configured to emit infrared light, which are used as the light-emitting elements 102, and elements capable of detecting the infrared light, which are used as the light-receiving elements 103. In this case, the light-emitting elements 102 always emit the infrared light, and the microphone 100 maintains the on-state while the light-receiving elements 103 receive the reflected light being the infrared light emitted from the light-emitting elements 102.

As another example of the proximity sensors, there may also be used elements configured to emit visible light (for example, LED elements) as the light-emitting elements 102. In this case, it is preferred that, for example, the following configuration be employed so as to prevent the microphone 100 from being erroneously turned on by light other than the reflected light being the light emitted from the light-emitting elements 102.

The light-emitting elements 102 emit the visible light in a pulsed manner, that is, in an intermittent manner. Then, when the number of times the light-reception intensity in the light-receiving elements 103 has increased by the light emitted from the light-emitting elements 102 in the pulsed manner, that is, the number of times the light-receiving elements 103 have received the reflected light being the light emitted from the light-emitting elements 102 has reached a predetermined number of times, the microphone 100 is turned on.

The embodiment of the present invention has been described above, but the present invention is not limited to the above-mentioned embodiment, and it is to be understood that various modifications can be made thereto without departing from the gist of the present invention.

Figure 3:
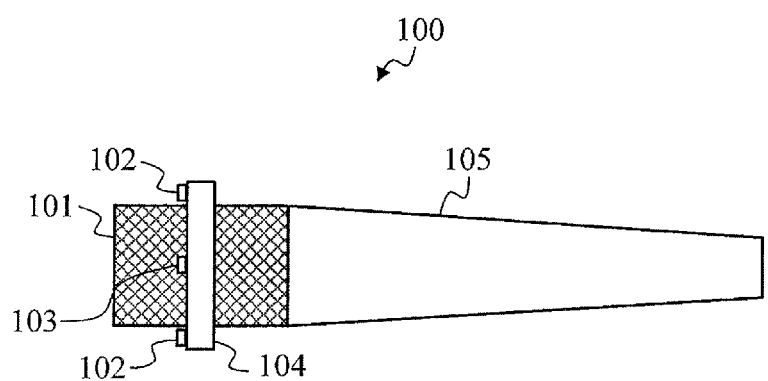
FIG. 3 is a view for illustrating a schematic structure of another example of the microphone according to the embodiment of the present invention.
Figure 4:
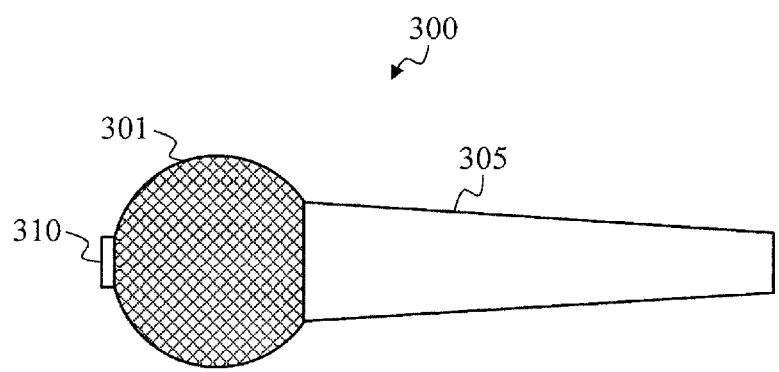
FIG. 4 is a view for illustrating a schematic structure of a related-art microphone.

For example, in the above-mentioned embodiment, description is made of the example in which the sound pickup portion 101 has the substantially spherical shape. However, as illustrated in FIG. 3, the sound pickup portion 101 may have, for example, a columnar shape having an axis oriented in a direction matching with a longitudinal direction of the grip portion 105, and be connected to the grip portion 105. In this case, the shape need not be a perfect column, and may be, for example, a truncated cone shape.

Further, in the above-mentioned embodiment, the light-emitting elements 102 and the light-receiving elements 103 are arranged on the upper surface of the protection ring 104. However, the protection ring 104 is not essential, and it is only necessary that the light-emitting elements 102 and the light-receiving elements 103 be arranged around the outer periphery of the sound pickup portion with the positional relationship and the orientation of the light-emitting surfaces 20 and the light-receiving surfaces 30 as illustrated in FIG. 2.

What is claimed is:

1. A microphone, comprising:
   a grip portion having a rod-like shape;
   a sound pickup portion having one of a substantially spherical shape and a substantially columnar shape having an axis matching with a longitudinal direction of the grip portion, and connected to one end of the grip portion;
   a first light-emitting element at a first position around an outer periphery of the sound pickup portion;
   a second light-emitting element at a second position opposed to the first position around the outer periphery of the sound pickup portion;
   a first light-receiving element at a third position being one of two intermediate points between the first position and the second position around the outer periphery of the sound pickup portion; and
   a second light-receiving element at a fourth position being another of the two intermediate positions,
   a light-emitting surface of each of the first light-emitting element and the second light-emitting element and a light-receiving surface of each of the first light-receiving element and the second light-receiving element oriented in a direction opposite to an extending direction of the grip portion from the sound pickup portion,
   the first and second light-receiving elements configured to receive reflected light from light emitted by the first and second light-emitting elements, and
   a power supply of the microphone turning on according to reception of reflected light from light emission by the first light-emitting element and/or the second light-emitting element and received by the first light-receiving element and/or the second light-receiving element.

2. A microphone according to claim 1, wherein the first light-emitting element and the second light-emitting element are configured to emit light in an intermittent manner, and wherein the power supply is turned on when a number of times the reflected light is received at the first light-receiving element and/or the second light-receiving element reaches a predetermined number of times.

3. A microphone according to claim 1, further comprising a protection ring around the outer periphery of the sound pickup portion, and configured to protect the sound pickup portion when the microphone is laid down, and the first light-emitting element, the second light-emitting element, the first light-receiving element, and the second light-receiving element residing on the protection ring.

* * * * *